(12) United States Patent
Okamoto

(10) Patent No.: US 8,385,781 B2
(45) Date of Patent: Feb. 26, 2013

(54) IMAGE READING DEVICE AND IMAGE FORMING APPARATUS INCLUDING THE SAME

(75) Inventor: Katsuhiko Okamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 464 days.

(21) Appl. No.: 12/708,068

(22) Filed: Feb. 18, 2010

(65) Prior Publication Data

US 2010/0215404 A1  Aug. 26, 2010

(30) Foreign Application Priority Data

Feb. 20, 2009  (JP) ................................. 2009-038598

(51) Int. Cl.
  *G03G 15/04* (2006.01)
(52) U.S. Cl. ....................................................... 399/221
(58) Field of Classification Search .................. 399/218, 399/220, 221; 347/117, 118, 119, 129, 130
See application file for complete search history.

(56) References Cited

U.S. PATENT DOCUMENTS

| 7,591,576 | B2 * | 9/2009 | Okamoto et al. |
| 7,755,811 | B2 * | 7/2010 | Herloski et al. |
| 8,194,294 | B2 * | 6/2012 | Tagawa et al. |
| 8,217,378 | B2 * | 7/2012 | Higashitani et al. |
| 2008/0180774 | A1 | 7/2008 | Tatsuno |
| 2011/0228353 | A1 * | 9/2011 | Okamoto |

* cited by examiner

*Primary Examiner* — Susan Lee

(57) ABSTRACT

The present invention provides an image reading device in which light guiding paths can be formed in a simple structure and adjustment of irradiation position of light irradiated onto the original is easy, including: a luminescence portion; a light guiding body including a first light incidence portion disposed on a luminescence portion side and a first light emission portion disposed on an original side; a first reflective surface connecting the first light incidence portion and the first light emission portion in the light guiding body; a light guiding space constitutive member including a second reflective surface facing the first reflective surface; a light guiding space formed between the first reflective surface and the second reflective surface, having a second light incidence portion disposed on an illumination portion side and a second light emission portion disposed on the original side; a mirror; an imaging lens; and a reading portion.

15 Claims, 9 Drawing Sheets

IMAGE READING DEVICE AND IMAGE FORMING APPARATUS INCLUDING THE SAME

This application is based upon and claims the benefit of priority from the corresponding Japanese Patent Application No. 2009-038598 filed on 20 Feb. 2009, the entire content of which are incorporated herein by reference.

BACKGROUND OF THE INVENTION

1. Field of the Invention

The present invention relates to an image reading device and an image forming apparatus including an image reading device.

2. Related Art

Conventionally, an image reading device for reading an image on an original has been known, including an illumination portion for irradiating light onto an original, a mirror for reflecting light from the original and forming a light path, an imaging lens for forming an image from a luminous flux from the original, and a CCD (charge-coupled device) for reading an image of the original formed by the imaging lens.

In a case where light is emitted from only one direction, an edge shadow (shadow of an edge of an original) due to the thickness of the original is easily generated. In order to suppress the edge shadow, for example, an image reading device has been proposed that is configured so as to irradiate light from a plurality of LEDs onto an original from first and second sides in a sub scanning direction (so as to provide a plurality of light guiding paths) by arranging the plurality of LEDs in a main scanning direction and providing two reflectors at predetermined positions.

SUMMARY OF THE INVENTION

However, in such an image reading device, since the two reflectors must be provided at the predetermined positions, the structure of the image reading device tends to be complex and adjustment of irradiation position of light irradiated onto the original is not easy.

The present invention is aimed at providing an image reading device in which a plurality of light guiding paths can be formed in a simple structure and adjustment of irradiation position of light irradiated onto the original is easy.

In addition, the present invention aims at providing an image forming apparatus including the image reading device.
Means for Solving the Problems The present invention relates to an image reading device including: an illumination portion that emits light for irradiating an original; a light guiding body that is disposed between the luminescence portion and the original, and has a first light incidence portion disposed on a side to the illumination portion and a first light emission portion disposed on a side to the original; a first reflection surface that is a part of an outer surface of the light guiding body connecting the first light incidence portion and the first light emission portion; a light guiding space constitutive member having a second reflection surface that is disposed at a position facing the first reflection surface and that faces the first reflection surface; a light guiding space formed between the first reflective surface and the second reflective surface, having a second light incidence portion disposed on a side to the illumination portion and a second light emission portion disposed on a side to the original; at least one mirror that forms a light path by reflecting a luminous flux from the original; an imaging lens that forms an image from the luminous flux reflected by the at least one mirror; and a reading portion that is disposed in an imaging position of the imaging lens, and reads an image of the original based on image formation by the imaging lens.

In addition, it is preferable that light from the first light emission portion is irradiated onto the original from a first side in a sub-scanning direction, and light from the second light emission portion is irradiated onto the original from a second side in the sub-scanning direction.

In addition, it is preferable that, between the first light incidence portion and the first light emission portion, the light guiding body includes: a bend portion where the light guiding body bends; a horizontal portion that extends in a sub-scanning direction from the first light incidence portion to the bend portion; and a slope portion that extends from the bend portion to the first light emission portion while sloping toward the original.

In addition, it is preferable that the horizontal portion has a horizontal portion upper surface that is formed on a side to the original and a horizontal portion lower surface that is formed on an opposite side to the side to the original, and the slope portion has a slope portion upper surface that extends from the horizontal portion upper surface toward the side to the original and a slope portion lower surface that extends from the horizontal portion lower surface toward the side to the original.

In addition, it is preferable that a reflective member that is disposed to correspond to the first light emission portion or the second light emission portion, and reflects light from the first light emission portion or the second light emission portion toward the side to the original is further included.

In addition, it is preferable that the reflective member is provided with a reflective surface having a concave shaped cross-section.

In addition, it is preferable that the illumination portion includes a plurality of luminescence members that is arranged in series at predetermined intervals in a main scanning direction.

In addition, it is preferable that the luminescence portion includes a luminescence member group composed of a plurality of luminescence members that is arranged in series at predetermined intervals in the main scanning direction, and the light guiding body includes the horizontal portion lower surface forming the light guiding space, and is disposed such that the horizontal portion lower surface substantially coincides with an emitted light axis of the luminescence member.

In addition, it is preferable that the luminescence portion has a luminescence member group composed of a plurality of luminescence members that is arranged in series at predetermined intervals in the main scanning direction, and the light guiding body includes the horizontal portion lower surface forming the light guiding space, and is configured such that distribution of intensity of light between the first light incidence portion and the second light incidence portion can be changed by changing a positional relationship between the horizontal portion lower surface and the emitted light axis of the luminescence member.

In addition, it is preferable that the illumination portion includes a plurality of luminescence members, and the plurality of luminescence members is arranged in series at predetermined intervals in the main scanning direction and arranged in a plurality of rows in a direction orthogonal to the main scanning direction.

In addition, it is preferable that the luminescence portion includes a first luminescence member group that is arranged in series at predetermined intervals in the main scanning direction, and a second luminescence member group that is disposed in line in a direction orthogonal to the main scanning direction of the first luminescence member group, and the first luminescence member group is disposed to face the first light incidence portion, and the second luminescence member group is disposed to face the second light incidence portion.

In addition, it is preferable that a luminescence control unit that controls luminescence in each of the first luminescence member group and in the second luminescence member group independently is further included.

In addition, it is preferable that a luminescence control unit that controls luminescence in each of the first luminescence member group and in the second luminescence member group independently, such that intensity of light from the first light emission portion irradiated onto the original and intensity of light from the second light emission portion irradiated onto the original are substantially equal is further included.

In addition, it is preferable that the luminescence control unit controls luminescence by changing a supply voltage to the luminescence member.

The present invention relates to an image forming apparatus including: the image reading device; an image supporting body on which an electrostatic latent image is formed on a surface thereof based on image information relating to an image of the original that is read by the image reading device; a developing unit that develops a toner image on the electrostatic latent image formed on the image supporting body; a transfer portion that directly or indirectly transfers the toner image formed on the image supporting body to a predetermined paper; and a fixing portion that fixes the toner image transferred to the predetermined paper by the transfer portion.

Effects of the Invention

According to the present invention, an image reading device can be provided in which a plurality of light guiding paths can be formed in a simple structure and adjustment of irradiation position of light irradiated onto the original is easy.

In addition, according to the present invention, an image forming apparatus including the abovementioned image reading device can be provided.

DETAILED DESCRIPTION OF THE INVENTION

Embodiments of the present invention are described hereinafter with reference to the drawings.

First, a first embodiment of the present invention is described with reference to FIGS. 1 to 7.

Figure 1:
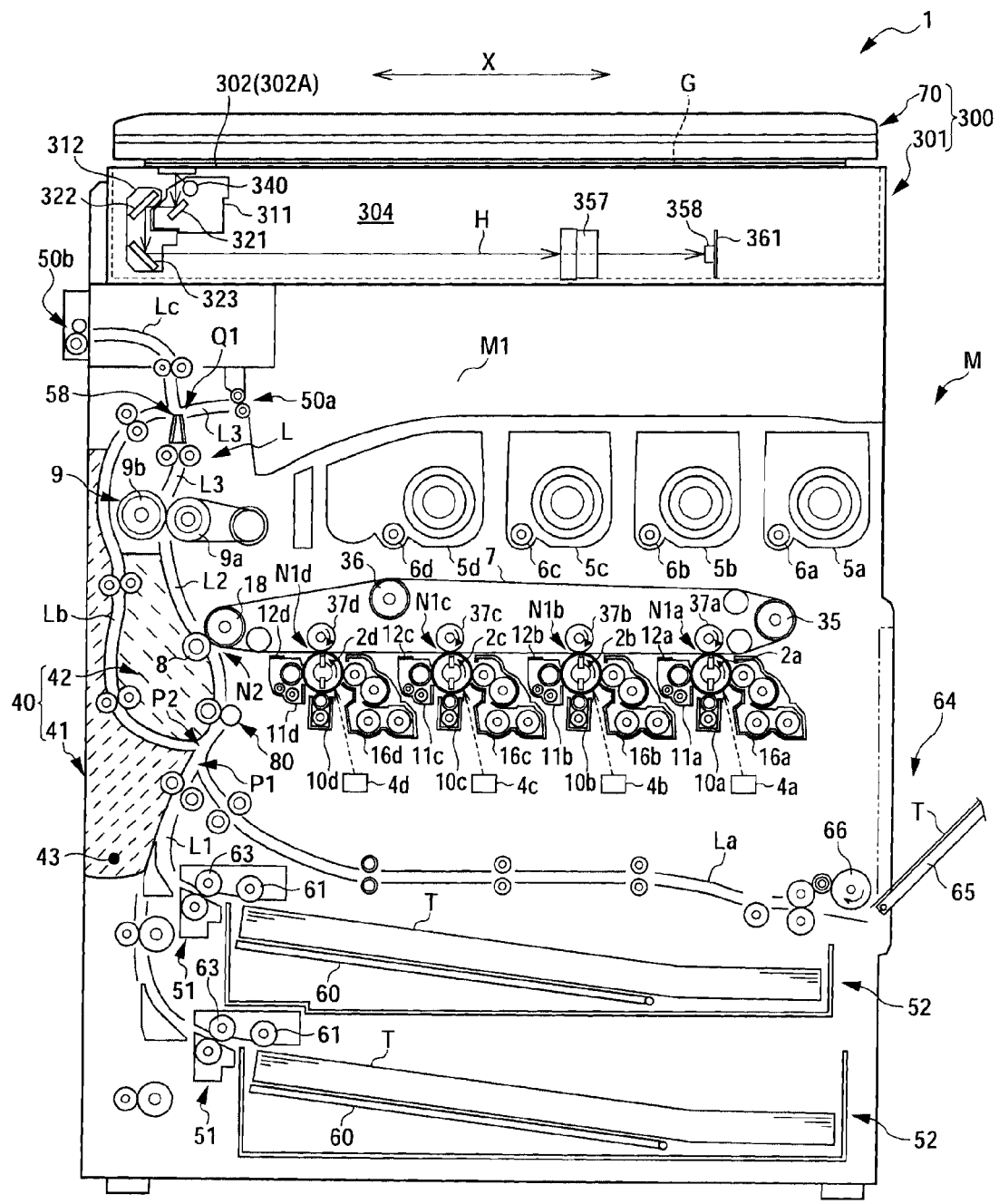
FIG. 1 is a diagram illustrating an arrangement of components of the copy machine 1.

An overall structure of a copy machine 1 as an image forming apparatus according to the present embodiment is described referring to FIG. 1. FIG. 1 is a diagram illustrating an arrangement of components of the copy machine 1.

As shown in FIG. 1, the copy machine 1 as the image forming apparatus includes: an image reading device 300 disposed on an upper side thereof; and a device main body M disposed on a lower side thereof. The device main body M forms a toner image on a paper T, as a sheet-shaped material to which the toner image is transferred, based on image information from the image reading device 300.

The image reading device 300 is described hereinafter.

As shown in FIG. 1, the image reading device 300 includes a flap member 70 and a reader portion 301 that reads an image on an original G. The flap member 70 is connected with the reader portion 301 by means of a connecting portion (not shown) so as to be openable and closable.

The flap member 70 protects a reading surface 302A (described later) while holding the original G.

The reader portion 301 includes the reading surface 302A, an illumination portion 340 including a light source disposed in an internal space 304, a plurality of mirrors 321, 322, and 323, a first frame body 311 and a second frame body 312 that move in a direction parallel to the reading surface 302A, an imaging lens 357, a CCD 358 having a reading function, and a CCD substrate 361. The CCD substrate 361 performs a predetermined process with respect to image data read by the CCD 358 and outputs the image data to the device main body M.

The reading surface 302A is formed along an upper face in a vertical direction of a contact glass 302 on which the original G is placed.

The abovementioned illumination portion 340 and the mirror 321 are housed in the first frame body 311. The mirrors 322 and 323 are housed in the second frame body 312.

In the internal space 304 of the reader portion 301, the plurality of mirrors 321, 322 and 323 forms a light path H so that light from the original G is incident upon the imaging lens 357. In addition, the first frame body 311 moves in a sub-scanning direction X at a predetermined speed A while the second frame body 212 moves in the sub-scanning direction X at the predetermined speed A/2. Therefore, the length of the light path H is kept constant even while reading an image. As a result, an image of the original G placed on the reading surface 302A is read.

The device main body M is described hereinafter.

The device main body M includes: an image forming portion for forming a predetermined toner image on the paper T on the basis of predetermined image information; and a paper feeding/ejection portion for feeding the paper T to the image forming portion and ejecting the paper T on which a toner image is formed.

As shown in FIG. 1, the image forming portion includes: photoreceptor drums 2a, 2b, 2c, and 2d as image carriers; charging portions 10a, 10b, 10c, and 10d; laser scanner units 4a, 4b, 4c, and 4d as exposure units; developing units 16a, 16b, 16c, and 16d; toner cartridges 5a, 5b, 5c, and 5d; toner feeding portions 6a, 6b, 6c, and 6d; drum cleaning portions 11a, 11b, 11c, and 11d; static eliminator 12a, 12b, 12c, and 12d; an intermediate transfer belt 7; primary transfer rollers 37a, 37b, 37c, and 37d; a secondary transfer roller 8; an opposing roller 18; and a fixing device 9.

As shown in FIG. 1, the paper feeding/ejection portion includes a paper feeding cassette 52, a manual feeding portion 64, a paper path L for the paper T, a resist roller pair 80, a first ejection portion 50a, and a second ejection portion 50b. It should be noted that the paper path L is a collective of a first paper path L1, a second paper path L2, a third paper path L3, a manual paper path La, a reverse paper path Lb, and a post-processing paper path Lc.

Components of the image forming portion and the paper feeding/ejection portion are described in detail hereinafter.

First, a description is provided for the image forming portion.

In the image forming portion, charging by the charging portions 10a, 10b, 10c, and 10d; exposure by the laser scanner units 4a, 4b, 4c, and 4d; development by the developing units 16a, 16b, 16c, and 16d; primary transfer by the intermediate transfer belt 7 and the primary transfer rollers 37a, 37b, 37c, and 37d; static elimination by the static eliminators 12a, 12b, 12c, and 12d; and cleaning by the drum cleaning portions 11a, 11b, 11c, and 11d, from an upstream side to a downstream side, are performed on a surface of the photoreceptor drums 2a, 2b, 2c, and 2d.

In addition, secondary transfer by the intermediate transfer belt 7, the secondary transfer roller 8 and the opposing roller 18, and fixing by the fixing device 9 are performed in the image forming portion.

Each of the photoreceptor drums 2a, 2b, 2c, and 2d is composed of a cylindrically shaped member and function as a photosensitive drum or an image carrier. Each of the photoreceptor drums 2a, 2b, 2c, and 2d is disposed so as to be rotatable in a direction of an arrow, about an axis that extends in a direction orthogonal to a direction of movement of the intermediate transfer belt 7. An electrostatic latent image is formed on a surface of each of the photoreceptor drums 2a, 2b, 2c, and 2d.

The charging portions 10a, 10b, 10c, and 10d are disposed so as to face a surface of the photoreceptor drums 2a, 2b, 2c, and 2d, respectively. The charging portions 10a, 10b, 10c, and 10d uniformly negatively charge (negative polarity) or positively charge (positive polarity) the surface of the photoreceptor drums 2a, 2b, 2c, and 2d, respectively.

The laser scanner units 4a, 4b, 4c, and 4d function as exposure units and are disposed to be spaced apart from the surface of the photoreceptor drums 2a, 2b, 2c, and 2d is removed respectively. The laser scanner units 4a, 4b, 4c, and 4d are configured to each include a laser light source, a polygonal mirror, a polygonal mirror driving motor and the like, which are not shown.

The laser scanner units 4a, 4b, 4c, and 4d scan and expose the surface of the photoreceptor drums 2a, 2b, 2c, and 2d respectively, based on image information read by the reader portion 301. By being scanned and exposed by the laser scanner units 4a, 4b, 4c, and 4d, an electric charge charged onto the surface of the photoreceptor drums 2a, 2b, 2c, and 2d is removed respectively. In this way, an electrostatic latent image is formed on a surface of each of the photoreceptor drums 2a, 2b, 2c, and 2d.

The developing units 16a, 16b, 16c, and 16d are disposed so as to correspond to the photoreceptor drums 2a, 2b, 2c, and 2d, respectively, and so as to face the surface of the photoreceptor drums 2a, 2b, 2c, and 2d. The developing units 16a, 16b, 16c, and 16d each develop a colored toner image by depositing toner of each color on the electrostatic latent image formed on each of the photoreceptor drums 2a, 2b, 2c, and 2d (a toner image is formed on a surface of the photoreceptor drum). The developing units 16a, 16b, 16c, and 16d correspond to the four toner colors of yellow, cyan, magenta, and black. The developing units 16a, 16b, 16c, and 16d are configured to include developing rollers that can be disposed to face the photoreceptor drums 2a, 2b, 2c, and 2d, stirring rollers for stirring toners, respectively, and the like.

The toner cartridges 5a, 5b, 5c, and 5d are provided correspondingly to the developing units 16a, 16b, 16c, and 16d, respectively. In addition, the toner cartridges 5a, 5b, 5c, and 5d store toners of the colors that are supplied to the developing units 16a, 16b, 16c, and 16d, respectively. The toner cartridges 5a, 5b, 5c, and 5d store toners of yellow, cyan, magenta, and black respectively.

The toner feeding portions 6a, 6b, 6c, and 6d are provided correspondingly to the toner cartridges 5a, 5b, 5c, and 5d and the developing units 16a, 16b, 16c, and 16d, respectively. The toner feeding portions 6a, 6b, 6c, and 6d supply the toners of the colors stored in the toner cartridges 5a, 5b, 5c, and 5d to the developing units 16a, 16b, 16c, and 16d, respectively.

Toner images of respective colors developed on the photoreceptor drums 2a, 2b, 2c, and 2d are sequentially transferred to the intermediate transfer belt 7. The intermediate transfer belt 7 is stretched around a driven roller 35, an opposing roller 18 consisting of a driving roller, a tension roller 36 and the like. Since the tension roller 36 biases the intermediate transfer belt 7 from the inside to the outside, a predetermined tension is applied to the intermediate transfer belt 7.

The primary transfer rollers 37a, 37b, 37c, and 37d are disposed across the intermediate transfer belt 7 from the photoreceptor drums 2a, 2b, 2c, and 2d so as to face the photoreceptor drums 2a, 2b, 2c, and 2d, respectively.

Predetermined portions of the intermediate transfer belt 7 are sandwiched between the primary transfer rollers 37a, 37b, 37c, and 37d and the photoreceptor drums 2a, 2b, 2c, and 2d, respectively. The predetermined portions being sandwiched are pressed against surfaces of the photoreceptor drums 2a, 2b, 2c, and 2d. Primary transfer nips N1a, N1b, N1c, and N1d are formed respectively between the photoreceptor drums 2a, 2b, 2c, and 2d and the primary transfer rollers 37a, 37b, 37c, and 37d. On each of the primary transfer nips N1a, N1b, N1c, and N1d, the toner images of the colors developed on the photoreceptor drums 2a, 2b, 2c, and 2d are sequentially transferred to the intermediate transfer belt 7. A full-color toner image is thus formed on the intermediate transfer belt 7.

A primary transfer bias is applied to each of the primary transfer rollers 37a, 37b, 37c, and 37d by a voltage application means (not shown). The primary transfer bias is a bias for transferring the toner images of the colors developed on the photoreceptor drums 2a, 2b, 2c, and 2d to the intermediate transfer belt 7 respectively.

The static eliminators 12a, 12b, 12c, and 12d are disposed so as to face a surface of the photoreceptor drums 2a, 2b, 2c, and 2d, respectively. The static eliminators 12a, 12b, 12c, and 12d each remove electricity (eliminate an electrical charge) from the surface of the photoreceptor drums 2a, 2b, 2c, and 2d after the primary transfer, by irradiating light onto the surface of each of the photoreceptor drums 2a, 2b, 2c, and 2d.

The drum cleaning portions 11a, 11b, 11c, and 11d are disposed so as to face a surface of the photoreceptor drums 2a, 2b, 2c, and 2d, respectively. The drum cleaning portions 11a, 11b, 11c, and 11d remove toner and attached matter remaining on the surface of the photoreceptor drums 2a, 2b, 2c, and 2d, respectively, and make the removed toner carried to a predetermined collection mechanism for collection.

The secondary transfer roller 8 secondarily transfers the toner image, which was primarily transferred to the intermediate transfer belt 7, to the paper T. A secondary transfer bias for transferring the toner image formed on the intermediate transfer belt 7 to the paper T is applied to the secondary transfer roller 8, by a voltage application means (not shown).

The secondary transfer roller 8 can be either brought into contact with or spaced apart from the intermediate transfer belt 7. More specifically, the secondary transfer roller 8 is configured to be movable between a contact position that is in contact with the intermediate transfer belt 7 and a spaced position that is spaced apart from the intermediate transfer belt 7. In particular, the secondary transfer roller 8 is moved to the contact position for transferring the toner image primarily transferred to a surface of the intermediate transfer belt 7 to the paper T, and to the spaced position in all other circumstances.

An opposing roller 18 is disposed across the intermediate transfer belt 7 from the secondary transfer roller 8. A part of the intermediate transfer belt 7 is sandwiched between the secondary transfer roller 8 and the opposing roller 18. The paper T is pressed against an outer surface (a side to which the toner image is primarily transferred) of the intermediate transfer belt 7. A secondary transfer nip N2 is formed between the secondary transfer roller 8 and the opposing roller 18. On the secondary transfer nip N2, the toner image primarily transferred to the intermediate transfer belt 7 is secondarily transferred to the paper T.

The fixing portion 9 fuses color toners constituting the toner image secondarily transferred to the paper T, in order to fix the color toners on the paper T. The fixing portion 9 includes a heat roller 9a that is heated by a heater, and a pressure roller 9b that is brought into pressure-contact with the heat roller 9a. The heating roller 9a and the pressurizing roller 9b sandwiches and conveys the paper T to which the toner image is secondarily transferred. The paper T is conveyed in a state of being sandwiched between the heating roller 9a and the pressurizing roller 9b, thereby fusing and fixing the toner transferred thereto.

Next, the paper feeding/ejection portion is described.

As shown in FIG. 1, two paper feeding cassettes 52 for housing the paper T are disposed one above the other on a lower side of the device main body M. The paper feeding cassette 52 is configured to be slidable in a horizontal direction from a housing of the device main body M. The paper feeding cassette 52 includes a paper tray 60 on which the paper T is placed. The paper feeding cassette 52 stores the paper T being stacked on the paper tray 60. The paper T placed on the paper tray 60 is fed to the paper path L by a cassette feeding portion 51 disposed in an end portion of the paper feeding cassette 52 on a side of feeding the paper (in a left end portion of FIG. 1). The cassette feeding portion 51 includes a double feed preventing mechanism consisting of: a forward feed roller 61 for picking up the paper T on the paper tray 60; and a paper feeding roller pair 63 for feeding the paper T one sheet at a time to the paper path L.

The manual feeding portion 64 is provided on a right lateral face (the right side in FIG. 1) of the device main body M. The manual feeding portion 64 is provided primarily for the purpose of feeding paper T that is different in size and type from the paper T stored in the paper feeding cassette 52 to the device main body M. The manual feeding portion 64 includes the manual feeding tray 65, which constitutes a portion of the device main body M in a closed state, and a paper feeding roller 66. A lower end of the manual feeding tray 65 is connected in the vicinity of the paper feeding roller 66, so as to be pivotable (openable and closable). The paper T is placed on the lower end of the manual feeding tray 65 in an opened state. The manual feeding portion 64 feeds the paper T placed on the manual feeding tray 65 in an opened state to a manual feeding path La.

A first ejection portion 50a and a second ejection portion 50b are provided on an upper side of the device main body M. The first ejection portion 50a and the second ejection portion 50b eject the paper T to the outside of the device main body M. The first ejection portion 50a and the second ejection portion 50b are described later in detail.

The paper path L includes: a first paper path L1 from the cassette feeding portion 51 to the secondary transfer roller 8; a second paper path L2 from the secondary transfer roller 8 to the fixing portion 9; a third paper path L3 from the fixing portion 9 to the first ejection portion 50a; the manual paper path La that guides paper fed from the manual feeding portion 64 to the first paper path L1; a reverse paper path Lb that reverses and returns the paper that is conveyed from an upstream side to a downstream side in the third paper path L3 to the first paper path L1; and a post-processing paper path Lc that conveys the paper that is conveyed from the upstream side to the downstream side in the third paper path L3 to a post-processing device (not shown).

In addition, a first junction P1 and a second junction P2 are provided in the middle of the first paper path L1. A first branch portion Q1 is provided in the middle of the third paper path L3.

The first junction P1 is a junction where the manual paper path La joins the first paper path L1. The second junction P2 is a junction where the reverse paper path Lb joins the first paper path L1.

The first branch portion Q1 is a branch portion where the post-processing paper path Lc branches off from the third paper path L3. A switching member 58 is provided in the first branch portion Q1. The switching member 58 shifts (switches) a conveying direction of the paper T discharged from the fixing portion 9 to the third paper path L3 or to the post-processing paper path Lc.

In addition, a sensor for detecting the paper T and a resist roller pair 80 for skew compensation of the paper T and timing adjustment with respect to the toner image are disposed in the middle of the first paper path L1 (more specifically, between the second junction P2 and the secondary transfer roller 8). The sensor is disposed immediately before the resist roller pair 80 in a conveying direction of the paper T (on an upstream side thereof). The resist roller pair 80 conveys the paper T while performing the abovementioned compensation and the timing adjustment based on detection information from the sensor.

For a case of performing duplex printing of the paper T, a reverse paper path Lb is provided, which is a paper path for making an opposite surface (an unprinted surface), to a surface that has already been printed, face toward the photoreceptor drum 2. The reverse paper path Lb can reverse and return the paper T, conveyed from the first branch portion Q1 toward the ejection portion 50, to the first paper path L1, in order to convey the paper T to an upstream side of the resist roller pair 80 disposed on an upstream side of the secondary transfer roller 8. A toner image is transferred by the photoreceptor drum 2 to an unprinted surface of the paper T that is reversed by the reverse paper path Lb.

The first ejection portion 50a is formed in an end portion of the third paper path L3. The first ejection portion 50a is disposed on an upper side of the device main body M. The first ejection portion 50a has an opening toward a right lateral face of the device main body M (right side in FIG. 1 and on a side of the manual feeding portion 64). The first ejection portion 50a ejects the paper T that is conveyed in the third paper path L3 to the outside of the device main body M.

An ejected paper accumulating portion M1 is formed on a side to the opening of the first ejection portion 50a. The ejected paper accumulating portion M1 is formed on an upper face (outer face) of the device main body M. The ejected paper accumulating portion M1 is a portion of the upper face of the device main body M formed to be depressed downward. A bottom face of the ejected paper accumulating portion M1 constitutes a part of the upper face of the device main body M. The paper T, to which a predetermined toner image is formed, ejected from the first ejection portion 50a is accumulated in the ejected paper accumulating portion M1.

The second ejection portion 50b is formed in an end portion of the post-processing paper path Lc. The second ejection portion 50b is disposed on the upper side of the device main body M. The second ejection portion 50b has an opening toward a left lateral face of the device main body M (left side in FIG. 1 and on a side to which the post-processing device is connected). The second ejection portion 50b ejects the paper T, which is conveyed in the post-processing paper path Lc, to the outside of the device main body M.

The post-processing device (not shown) is connected to a side to the opening of the second ejection portion 50b. The post-processing device performs post processing (stapling, punching and the like) of the paper ejected from the image forming apparatus (copy machine 1).

It should be noted that a sensor for detecting paper is disposed in a predetermined position on each paper path.

Next, a structure for eliminating paper jams in main paper paths L1 to L3 (the first paper path L1, the second paper path L2, and the third paper path L3 are also collectively referred to as "main paper paths" hereinafter) and in the reverse paper path Lb is briefly described.

As shown in FIG. 1, on a left lateral face side of the device main body M (left side in FIG. 1), the main paper paths L1 to L3 and the reverse paper path Lb are disposed in parallel so as to extend mainly in a vertical direction. On a left lateral face side of the device main body M (left side in FIG. 1), a cover body 40 is provided so as to form a portion of the lateral face of the device main body M. A lower end portion of the cover body 40 is connected with the device main body M via a fulcrum shaft 43. The fulcrum shaft 43 is disposed so that an axial direction thereof is along a direction intersecting the main paper paths L1 to L3 and the reverse paper path Lb. The cover body 40 is configured to be pivotable about the fulcrum shaft 43 between a closed position (shown in FIG. 1) and an opened position (not shown).

The cover body 40 is composed of a first cover portion 41 that is connected with the device main body M to be pivotable by the fulcrum shaft 43 and a second cover portion 42 that is connected with the device main body M to be pivotable by the same fulcrum shaft 43. The first cover portion 41 is positioned more to an external side (lateral face side) of the device main body M than the second cover portion 42. It should be noted that, in FIG. 1, the first cover portion 41 is a part hatched with falling diagonal broken lines from top right to bottom left, and the second cover portion 42 is a part hatched with falling diagonal broken lines from top left to bottom right.

In a state where the cover body 40 is in a closed position, an outer face side of the first cover portion 41 constitutes a portion of an outer face (lateral face) of the device main body M.

In addition, in a state where the cover body 40 is in the closed position, an inner face side (a side to the device main body M) of the second cover portion 42 constitutes a portion of the main paper paths L1 to L3.

Furthermore, in a state where the cover body 40 is in the closed position, an inner face side of the first cover portion 41 and an outer face side of the second cover portion 42 constitute at least a portion of the reverse paper path Lb. In other words, the reverse paper path Lb is formed between the first cover portion 41 and the second cover portion 42.

Since the copy machine 1 according to the present embodiment is provided with the cover body 40 thus configured, in a case where a paper jam occurs in the main paper paths L1 to L3, jammed paper in the main paper paths L1 to L3 can be removed by opening the main paper paths L1 to L3 by pivoting the cover body 40 from the closed position shown in FIG. 1 to the opened position (not shown). On the other hand, in a case where a paper jam occurs in the reverse paper path Lb, jammed paper in the reverse paper path Lb can be removed by opening the reverse paper path Lb by pivoting the cover body 40 to the opened position and then pivoting the second cover portion 42 about the fulcrum shaft 43 toward the device main body M (right side in FIG. 1).

Next, the reader portion 301 constituting the image reading device 300 is described hereinafter with reference to FIGS. 2 to 7.

Figure 2:
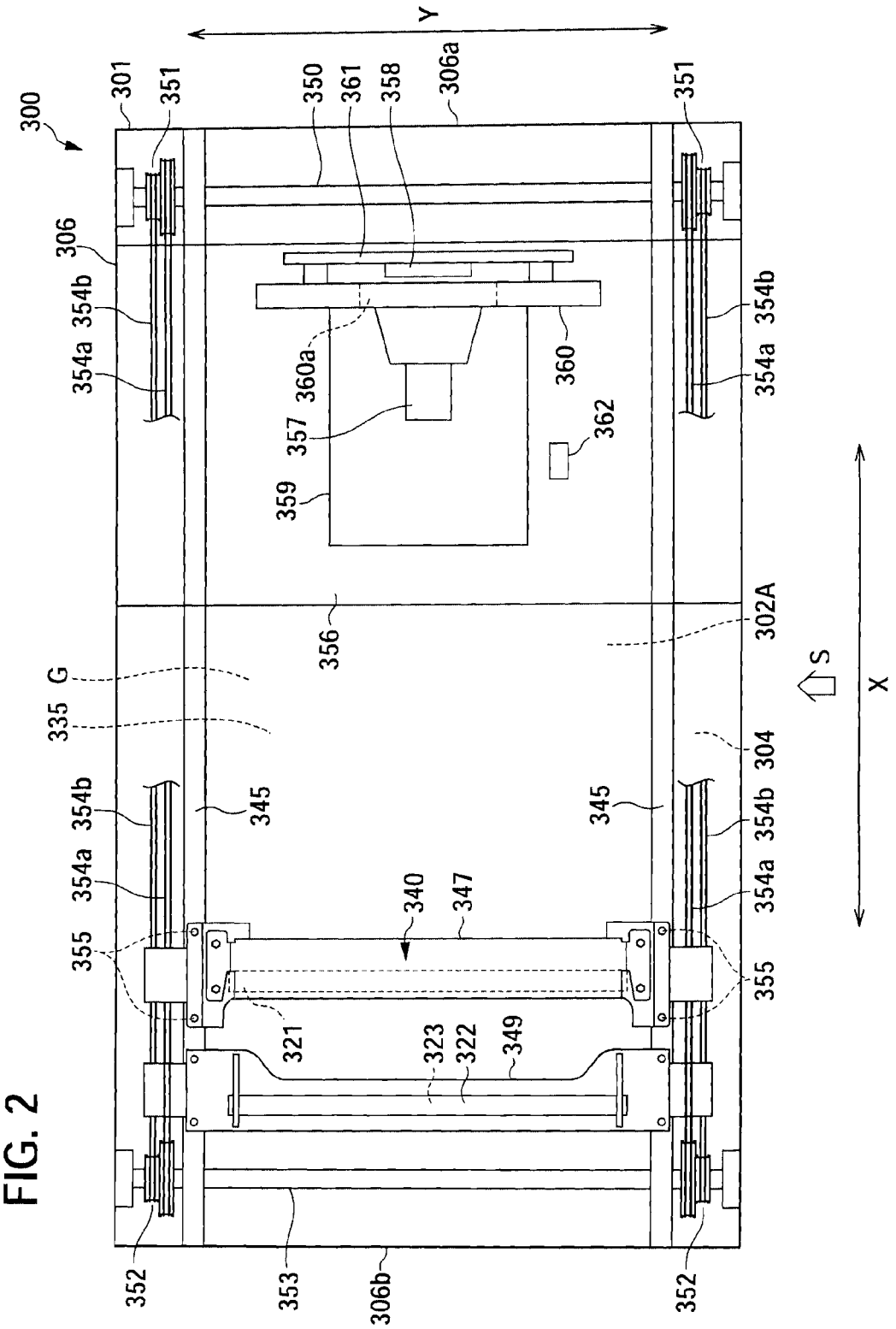
FIG. 2 is a schematic plan view of an internal configuration of a reader portion 301 of the image reading device 300 of the first embodiment.
Figure 3:
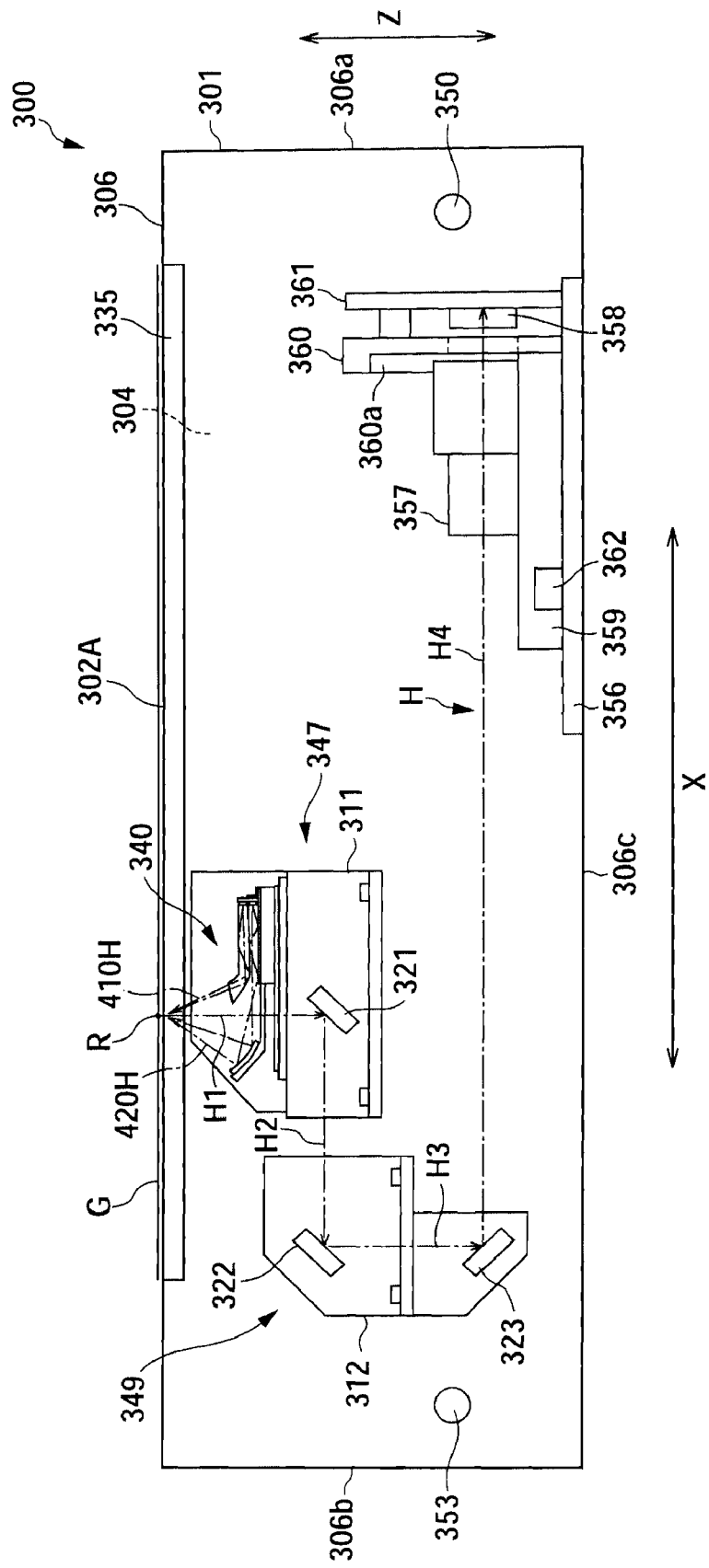
FIG. 3 is a diagram of the image reading device 300 shown in FIG. 2 viewed from a direction of an arrow S.
Figure 4:
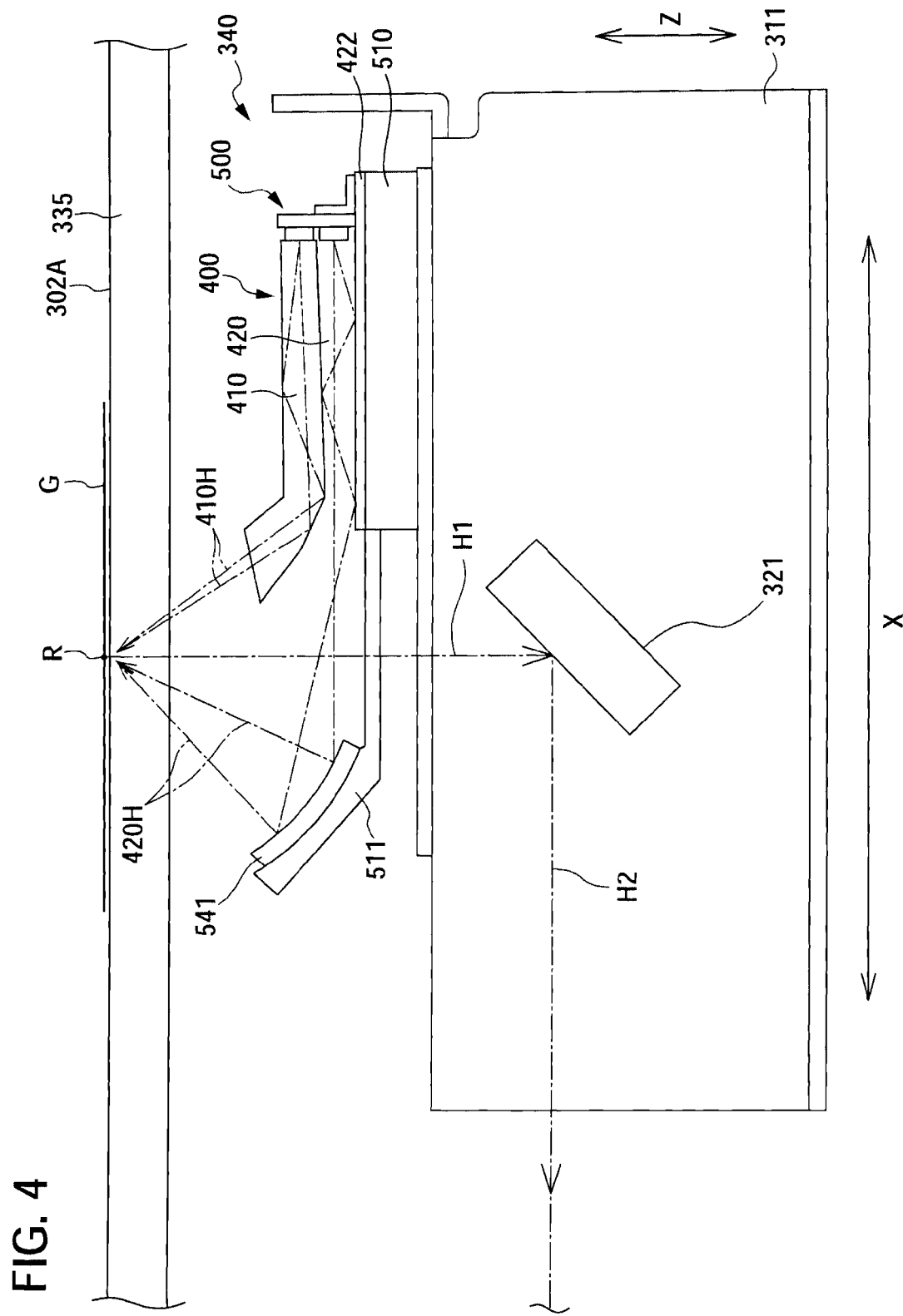
FIG. 4 is a cross-sectional view showing a configuration of the illumination portion 340.
Figure 5:
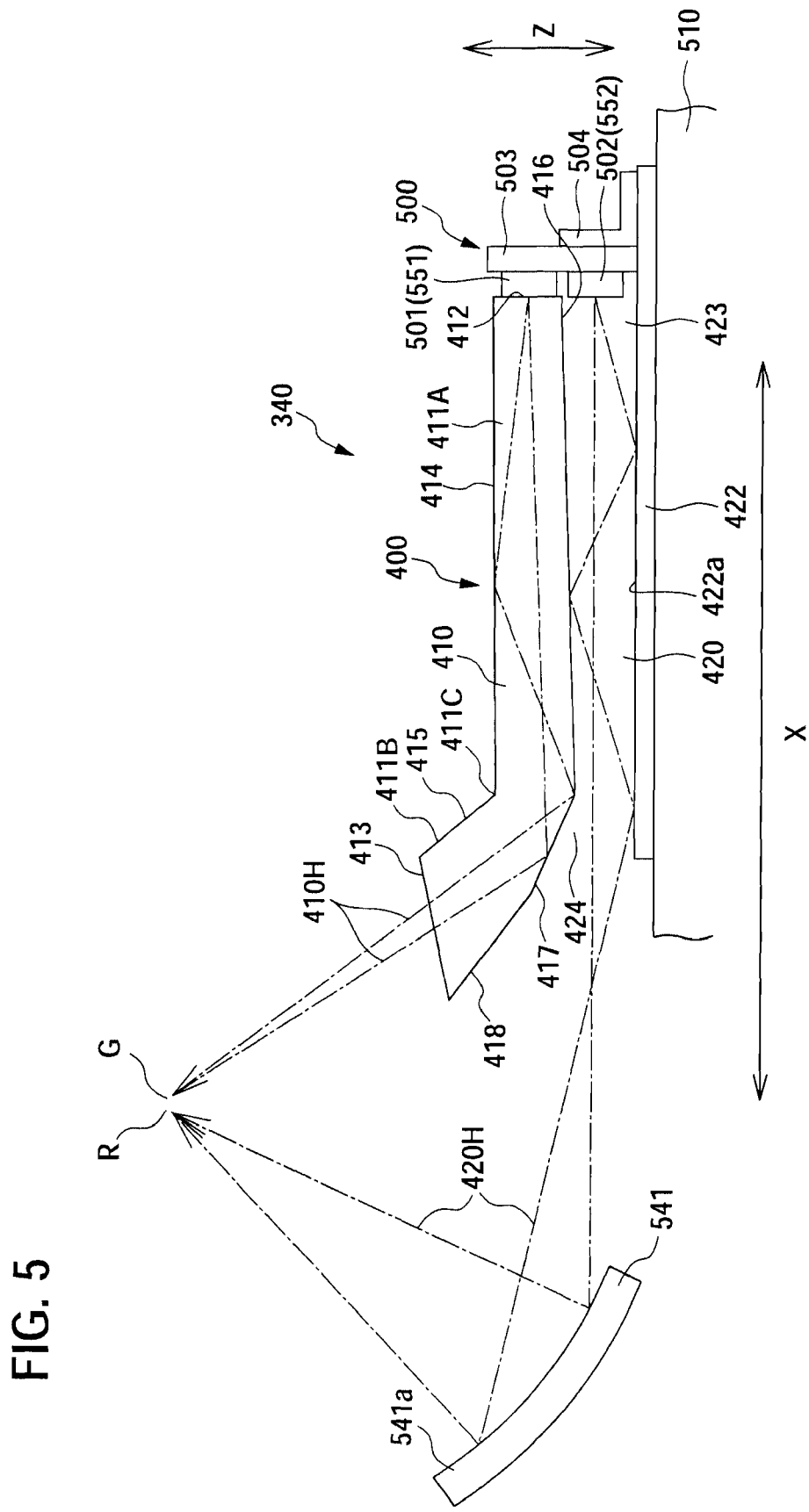
FIG. 5 is a partial enlarged view of the light guiding body 410 shown in FIG. 3.
Figure 6:
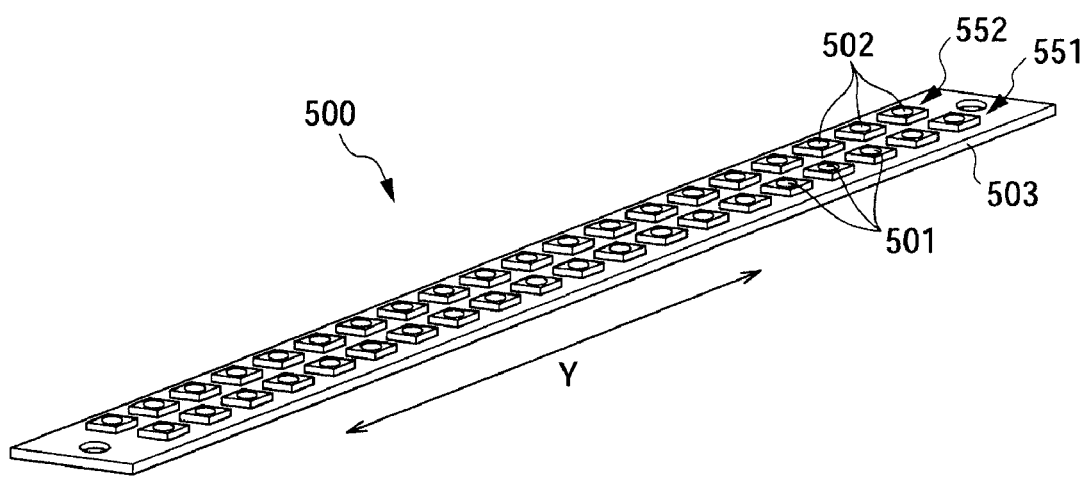
FIG. 6 is a perspective view of an LED unit 500 shown in FIG. 3.
Figure 7:
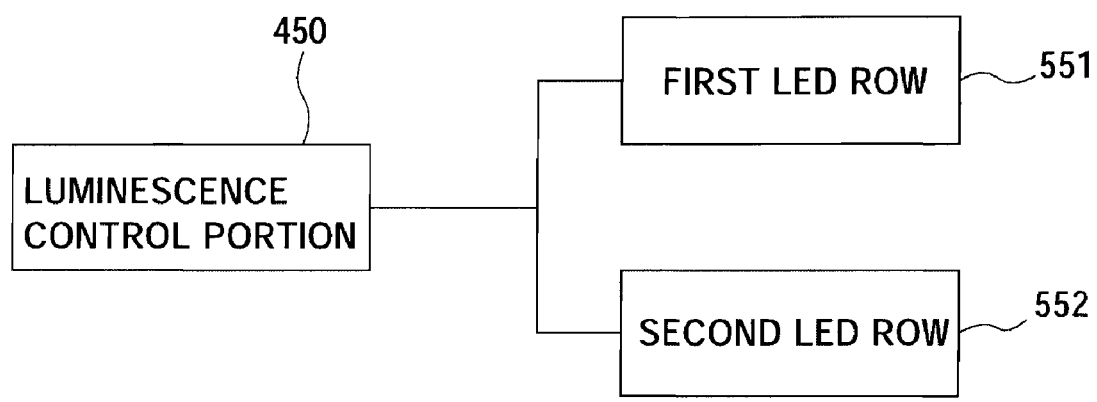
FIG. 7 is a block diagram including a luminescence control unit 450 that controls luminescence of the LED unit 500.

FIG. 2 is a schematic plan view of an internal configuration of a reader portion 301 of the image reading device 300 of the first embodiment. FIG. 3 is a diagram of the image reading device 300 shown in FIG. 2 viewed from a direction of an arrow S. FIG. 4 is a cross-sectional view showing a configuration of the illumination portion 340. FIG. 5 is a partial enlarged view of the light guiding body 410 shown in FIG. 3. FIG. 6 is a perspective view of an LED unit 500 shown in FIG. 3. FIG. 7 is a block diagram including a luminescence control unit 450 that controls luminescence of the LED unit 500.

As shown in FIGS. 2 and 3, the reader portion 301 includes: a contact glass 335 on which the original G is placed; a pair of guide rails 345; a drive shaft 350 to which drive pulleys 351 are attached; a spindle 353 to which driven pulleys 352 are attached; an illumination unit 347 as the illumination means; a mirror unit 349; an imaging lens 357; a CCD 358 having a reading function; and an optical sensor 362.

As shown in FIG. 2, the reader portion 301 includes the contact glass 335 on an upper face thereof (on a front side of FIG. 2), on which the original G is placed. The contact glass 335 is disposed substantially in parallel to a horizontal plane in a case where the copy machine 1 is disposed in a normal state.

As shown in FIG. 2, the pair of guide rails 345 is disposed between lateral faces 306a and 306b (on the left and the right in FIG. 2) of the reader portion 301. The pair of guide rails 345 is disposed in parallel with the abovementioned contact glass 335 (see FIG. 3). The illumination unit 347 and the mirror unit 349 are movably disposed on the pair of guide rails 345.

As shown in FIG. 2, the drive shaft 350 is disposed on a side to the lateral face 306a, so as to be orthogonal to the pair of guide rails 345. The drive shaft 350 is driven for normal or reverse rotation by a driving motor (not shown). The drive pulleys 351 each having a major diameter portion and a minor diameter portion are attached at both ends of the drive shaft 350, more outward in the main scanning direction Y than the guide rails 345.

As shown in FIG. 2, the spindle 353 is disposed on a side to the lateral face 306b, so as to be orthogonal to the pair of guide rails 345. The driven pulleys 352 having the same diameter as the drive pulleys 351 are attached at both ends of the spindle 353, more outward in the main scanning direction Y than the guide rails 345.

A driving wire 354a is wound on the major diameter portion of the drive pulley 351 and the driven pulley 352. Then, the illumination unit 347 is fixed to the driving wire 354a.

In addition, a driving wire 354b is wound on the minor diameter portion of the drive pulley 351 and the driven pulley 352. Additionally, the mirror unit 349 is fixed to the driving wire 354b.

The driving wires 354a and 354b are rotated in accordance with rotation of the drive shaft 350 by the driving motor. As a result, the illumination unit 347 and the mirror unit 349 are moved in the sub-scanning direction X (in a horizontal direction in FIGS. 2 and 3) along the pair of guide rails 345, in accordance with rotation of the driving wires 354a and 354b. A ratio of diameters between the major diameter portion and the minor diameter portion, in the drive pulley 351 and the driven pulley 352, is 2:1. Therefore, a ratio of travel distance between the illumination unit 347 and the mirror unit 349 is also 2:1.

It should be noted that, although a configuration where a ratio of travel distance between the illumination unit 347 and the mirror unit 349 is 2:1 is realized by using the drive pulley 351 and the driven pulley 352 having the major diameter portion and the minor diameter portion in the present embodiment, the present invention is not limited thereto. For example, a configuration where a ratio of travel distance between the illumination unit 347 and the mirror unit 349 is 2:1 can be realized also by the principle of movable pulleys, by providing a moving pulley in the mirror unit 349 and providing the illumination unit 347 fixed to a driving wire or the like.

Here, two contacts 355 are provided on each portion of the illumination unit 347 and the mirror unit 349 contacting upper faces of the guide rails 345. The contacting surface of each of the contacts 355 with the guide rails 345 is made to be spherical. This allows for smooth movement of the illumination unit 347 and the mirror unit 349 in the sub-scanning direction X.

As shown in FIG. 2, an ISU base 356, which is a member for supporting the imaging lens 357, the CCD 358 and the like, is attached to a bottom face of the reader portion 301 on a side to the lateral face 306a. The imaging lens 357 and the CCD 358 having a reading function are attached to an upper face of the ISU base 356 in a predetermined positional relationship.

As shown in FIG. 2, the imaging lens 357 is mounted on a lens supporting mount 359 that is fixed on the ISU base 356. The lens supporting mount 359 is disposed so that a position thereof can be adjusted by a guiding member 360 disposed on a side to the CCD 358. The imaging lens 357 is disposed substantially in a center of the reader portion 301 in the sub-scanning direction X. The imaging lens 357 is disposed on a side to an end portion that is opposite to a side to the original G on the light path H (see FIG. 3). The imaging lens 357 forms an image in a predetermined position from the luminous flux H4 (see FIG. 3) incident thereon. In other words, the imaging lens 357 forms an image of the original G in the predetermined position.

As shown in FIG. 2, the CCD 358 is mounted on a CCD substrate 361 disposed on a back surface of the guiding member 360. The CCD 358 is disposed in an imaging position of the imaging lens 357. Luminous flux from the imaging lens 357 is incident on the CCD 358 via an open window 360a formed in the vicinity of a center of the guiding member 360. A light axis of the luminous flux incident upon the CCD 358 is compensated by fine-tuning the position of the guiding member 360.

The optical sensor 362 is disposed on the ISU base 356. The optical sensor 362 determines the size of the original G (a size in X direction in FIG. 2) based on whether a reflected light is received from the original G placed on the contact glass 335.

As shown in FIG. 3, the illumination unit 347 includes: an illumination portion 340; a first mirror 321; and a first frame body 311 for housing the illumination portion 340 and the first mirror 321.

The illumination portion 340 includes an LED unit 500 to which a plurality of LEDs 501 and 502 is attached as the luminescence portion and a light guiding portion 400 disposed in the vicinity of or in contact with the plurality of LEDs 501 and 502 (see FIGS. 4 and 5). The illumination portion 340 is described later in detail.

The first mirror 321 is disposed on a lower side of the illumination unit 347 in a thickness direction Z. The first mirror 321 is disposed so as to direct a reflective surface thereof toward the original G and the second mirror 322. The first mirror 321 reflects the luminous flux H1 from the original G to direct the luminous flux H1 toward the second mirror 322.

The first frame body 311 is fixed to the driving wire 354a (see FIG. 2) wound on the major diameter portions of the drive pulley 351 and the driven pulley 352 (see FIG. 2). The first frame body 311 is moved in the sub-scanning direction X along the guide rail 345, in accordance with rotation of the driving wire 354a.

As shown in FIG. 3, the mirror unit 349 includes: a second mirror 322; a third mirror 323; and a second frame body 312 for housing the second mirror 322 and the third mirror 323.

The second mirror 322 is disposed on an upper side of the second frame body 312 in a thickness direction Z. The second mirror 322 is disposed so as to direct a reflective surface thereof toward the first mirror 321 and the third mirror 323. The second mirror 322 reflects a luminous flux H2 from the first mirror 321 to direct the luminous flux H2 toward the third mirror 323.

The third mirror 323 is disposed on a lower side of the second frame body 312 in a thickness direction Z. The third mirror 323 is disposed so as to direct a reflective surface thereof toward the second mirror 322 and the imaging lens 357. The third mirror 323 reflects a luminous flux H3 from the second mirror 322 to direct the luminous flux H3 toward the imaging lens 357.

Hereinafter, the illumination portion 340 is described in detail with reference to FIGS. 4 to 7.

As shown in FIGS. 4 and 5, the illumination portion 340 includes: the LED unit 500 as the luminescence portion; the light guiding portion 400 that guides light emitted from the LED unit 500 to a predetermined path; and a reflection mirror 541 that further deflects a light path of the light guided by the light guiding body 400 toward a reading target portion R on the original G. The LED unit 500, the light guiding portion 400, and the reflective mirror 541 are attached to the attaching member 510. The light guiding portion 400 has a bi-layered structure consisting of the light guiding body 410 and the light guiding space 420.

As shown in FIG. 6, the LED unit 500 includes a substrate member 503 and two rows of LEDs that are mounted on a first surface of the substrate member 503. The two rows of LEDs consist of a first LED row (first luminescence member group) 551 in which a plurality of LEDs 501 is aligned at predetermined intervals in the main scanning direction Y and a second LED row (second luminescence member group) 552 in which a plurality of LEDs 502 is aligned at predetermined intervals in the main scanning direction Y. The first LED row 551 and the second LED row 552 are disposed in parallel at a predetermined interval in the thickness direction Z that is orthogonal to the main scanning direction Y.

Each of the LEDs 501 and 502 in the LED unit 500 emits light.

As shown in FIG. 5, the LED unit 500 is attached to an attaching member 510 via the bracket 504 in a state in which the first LED row 551 is directed toward an upper side in the thickness direction Z, and in which an emitted light axis (output light axis) of each of the LEDs 501 and 502 and an array direction of the LEDs 501 and 502 are substantially parallel to the contact glass 335, respectively.

The attaching member 510 is formed of a material such as a metal to have a predetermined rigidity. As shown in FIGS. 4 and 5, the attaching member 510 is disposed on an upper side (upper side in FIG. 4) in the first frame body 311. The LED unit 500, the light guiding portion 400, and the reflective mirror 541 are attached to the attaching member 510.

As shown in FIG. 5, the light guiding portion 400 is a light guiding portion (the light guiding body 410 and the light guiding space 420) consisting of two layers stacked in the thickness direction Z. The light guiding portion 400 has a length in the main scanning direction Y corresponding to the LED unit 500.

It should be noted that, in the following description of the light guiding portion 400, an emission side of light (left side in FIGS. 2 to 5) is referred to as a "front side" and an opposite side thereto is referred to as a "rear side".

The light guiding body 410 includes a first light incidence portion 412 disposed on a side to the LED unit 500 and a first light emission portion 413 disposed on a side to the original G. The light guiding body 410 is disposed such that the first light incidence portion 412 is directed toward the first LED rows 551 and the first light emission portion 413 is directed toward the contact glass 335. The light guiding body 410 is formed of a material that is transparent to light emitted by the first LED row 551 in the LED unit 500 (such as acrylic resin).

The first light incidence portion 412 is disposed to face the first LED row 551. Light from the first LED row 551 is incident upon the first light incidence portion 412 toward the inside of the light guiding body 410. The first light emission portion 413 is disposed to face the reading surface 302A. The first light emission portion 413 emits light, which is incident upon the first light incidence portion 412, toward the reading surface 302A. As described above, the light guiding body 410 is configured to emit light, which is incident from the first light incidence portion 412, from the first light emission portion 413, thereby guiding the light from the first LED row 551 to the reading target portion R.

The light guiding body 410 includes a bend portion 411C, where the light guiding body 410 bends, between the first light incidence portion 412 and the first light emission portion 413. The light guiding body 410 includes a horizontal portion 411A extending from the first light incidence portion 412 to the bend portion 411C and a slope portion 411B extending from the bend portion 411C to the first light emission portion 413.

The horizontal portion 411A is formed to extend in the sub-scanning direction X. The slope portion 411B bends (inclines and extends) toward the reading surface 302A (the original G) via the bend portion 411C, at a predetermined angle with respect to the horizontal portion 411A. The light guiding body 410 is formed such that the horizontal portion 411A and the slope portion 411B are continuous via the bend portion 411C.

As shown in FIG. 3, the light guiding body 410 has a shape bending at the bend portion 411C in order to ensure a distance from the LED 501 to the reading target portion R and to realize space reduction (especially in the thickness direction Z) by effectively using an internal space 304. This is for sufficiently dispersing light from the LED 501 on the reading target portion R and suppressing uneven light intensity, by ensuring a distance from the LED 501 to the reading target portion R.

In addition, the light guiding body 410 is provided with a reflective surface on an inner surface thereof, for emitting the light, which is incident to the first light incidence portion 412, from the first light emission portion 413 while avoiding unnecessary dispersion thereof. For example, light reflected by the reflective surface in the slope portion 411B is refracted at each angle and guided toward the reading surface 302A.

As shown in FIGS. 4 and 5, a luminous flux 410H emitted from the first light emission portion 413 is condensed by the reflective surface formed on the inner surface of the light guiding body 410 and emitted toward the reading surface 302. The light guiding body 410 guides light, which is incident upon the first light incidence portion 412, towards the reading target portion R, while suppressing unnecessary diffusion.

The upper side (original G side) of the light guiding body 410 consists of a horizontal portion upper surface 414 of the horizontal portion 411A and a slope portion upper surface 415 of the slope portion 411B. The horizontal portion upper surface 414 is a surface extending substantially horizontally from the first light incidence portion 412 to the front side. The slope portion upper surface 415 is a surface formed to extend from a front side end portion of the horizontal portion upper surface 414, upward at a predetermined angle with respect to the horizontal portion upper surface 414 (toward the original G side).

As shown in FIG. 5, the lower side (an opposite side to the original G side) of the light guiding body 410 consists of a horizontal portion lower surface 416 of the horizontal portion 411A, a first slope portion lower surface 417 and a second slope portion lower surface 418 of the slope portion 411B. The horizontal portion lower surface 416 is a surface extending substantially horizontally from the first light incidence portion 412 to the front side. The first slope portion lower surface 417 is a surface formed to extend from a front side end portion of the horizontal portion lower surface 416, upward at a predetermined angle with respect to the horizontal portion upper surface 414 (toward the original G side). The second slope portion lower surface 418 is a surface formed to extend from a front side end portion of the first slope portion lower surface 417, further upward at a predetermined angle with respect to the first slope portion lower surface 417.

The horizontal portion upper surface 414 and the horizontal portion lower surface 416 are configured to have a predetermined interval therebetween in the thickness direction Z. On the horizontal portion upper surface 414, the slope portion upper surface 415, the horizontal portion lower surface 416, the first slope portion lower surface 417 and the second slope portion lower surface 418, a reflective film that improves light reflectivity is formed by vacuum deposition, sputtering or the like, as necessary.

The first light incidence portion 412 is substantially orthogonal to the horizontal portion upper surface 414 and the horizontal portion lower surface 416.

The first light emission portion 413 is obtuse-angled with respect to the slope portion upper surface 415 and acute-angled with respect to the second slope portion lower surface 418. Therefore, the first light emission portion 413 is formed to incline to be lower on the front side, at a predetermined angle with respect to a surface parallel to the contact glass 335 (original G).

Next, the light guiding space 420 is described hereinafter. As shown in FIG. 5, the light guiding space 420 is constituted of the horizontal portion lower surface 416 of the light guiding body 410 and a light guiding space constitutive member 422 disposed below the light guiding body 410. The light guiding space 420 includes a second light incidence portion 423 disposed on a side to the LED unit 500 and a second light emission portion 424 disposed on a side to the original G. The light guiding space constitutive member 422 is disposed below the light guiding body 410, substantially parallel to the horizontal portion lower surface 416 with a predetermined distance therefrom. A front end edge of the light guiding space constitutive member 422 is positioned more in front, by a predetermined amount, than a corner portion formed of the horizontal portion lower surface 416 and the first slope portion lower surface 417.

As described above, a space between the light guiding body 410 and the light guiding space constitutive member 422 constitutes the light guiding space 420. In other words, the horizontal portion lower surface 416 corresponds to "a first reflective surface that is a part of an outer surface of the light guiding body (410) connecting the first light incidence portion (412) and the first light emission portion (413)" (the "horizontal portion lower surface 416" is also referred to as a "first reflective surface 416 hereinafter"). The first reflective surface 416 can be formed also by, for example, forming a reflective layer of high beam reflectivity on a lower surface side of the light guiding space 420, by a method such as pasting, plating, vacuum deposition, sputtering and the like.

An upper surface of the light guiding space constitutive member 422 is made to be a second reflective surface 422a of a predetermined beam reflectivity. The second reflective surface 422a of the light guiding space constitutive member 422 is disposed at a position facing the first reflective surface 416. The second reflective surface 422a can be formed by, for example, making the light guiding space constitutive member 422 a metal plate (aluminum alloy, stainless steel alloy and the like) that is superior in beam reflectivity. The second reflective surface 422a can be subjected to a process for enabling reflection of a beam or for improving beam reflectivity, as necessary. As such a process, mirror polishing, plating, painting and the like can be exemplified. Alternatively, the second reflective surface 422a can be formed by making the light guiding space constitutive member 422 a material not reflecting a beam such as a plastic plate and then forming a reflective layer of high beam reflectivity on an upper surface of the light guiding space constitutive member 422 by a method such as pasting, plating, vacuum deposition, sputtering and the like.

As shown in FIG. 5, the light guiding portion 400 is supported by the attaching member 510 that is fixed on an upper surface of the first frame body 311. The first light incidence portion 412 of the light guiding body 410 faces the first LED row 551 in the LED unit 500. The second light incidence portion 423 of the light guiding space 420 faces the second LED row 552 in the LED unit 500.

The horizontal portion upper surface 414, the horizontal portion lower surface 416, and the light guiding space constitutive member 422 in the light guiding body 410 are substantially horizontal to the contact glass 335.

As shown in FIGS. 4 and 5, in the front side of the light guiding space 420 in the light guiding portion 400, the reflective mirror 541 as the reflective member is disposed so as to correspond to the second light emission portion 424. The reflection mirror 541 reflects light emitted from the second light emission portion 424 toward the original G side. The reflection mirror 541 is disposed more to the front side than the reading target portion R on the original G. The reflective mirror 541 is provided with a reflective surface 541a having a concave shaped cross-section.

The reflective mirror 541 is provided on the attaching member 510 via a mirror mount 511 in a state where a central axis of the reflective surface 541a is directed toward the second light emission portion 424 of the light guiding space 420 and toward the reading target portion R on the original G.

As shown in FIG. 5, according to the light guiding portion 400 configured as above, light emitted from the plurality of LEDs 501 constituting the first LED row 551 is incident upon the light guiding body 410 through the first light incidence portion 412 and emitted from the first light emission portion 413 through the inside of the light guiding body 410. For example, light in the vicinity of a light axis emitted from the LED 501 constituting the first LED row 551 travels straight inside the guiding body 410, is totally reflected by an inner surface of the first slope portion lower surface 417 or by an inner surface of the second slope portion lower surface 418, and then emitted from the first light emission portion 413. In addition, ambient light, which is emitted from the LED 501 constituting the first LED row 551 and spreads in a vertical direction, is repeatedly totally reflected between an inner surface of the horizontal portion upper surface 414 and an inner surface of the horizontal portion lower surface 416, then totally reflected by the inner surface of the first slope portion lower surface 417 or by the inner surface of the second slope portion lower surface 418, and finally emitted from the first light emission portion 413.

Furthermore, ambient light, which is emitted from the LED 501 constituting the first LED row 551 and spreads in a horizontal direction (main scanning direction Y), travels in an angled direction with respect to the sub-scanning direction X while being repeatedly totally reflected between an inner surface of the horizontal portion upper surface 414 and an inner surface of the horizontal portion lower surface 416, and then emitted from the first light emission portion 413 (not shown). As a result, light that is scattered and made to be substantially uniform in the main scanning direction Y (a primary irradiation luminous flux 410H) is emitted from the first light emission portion 413. Therefore, it is possible to suppress uneven light intensity (uneven illuminance) due to intermittent arrangement of the plurality of LEDs 501 in the main scanning direction Y.

The primary irradiation luminous flux 410H is emitted from the light guiding body 410 diagonally toward the front side, with a predetermined angle with respect to the horizontal portion lower surface 416. A central light axis of the primary irradiation luminous flux 410H is configured to be directed toward the reading target portion R. As a result, the primary irradiation luminous flux 410H emitted from the first light emission portion 413 irradiates the reading target portion R on the original G at a predetermined angle from the rear side.

On the other hand, light emitted from the plurality of LEDs 502 constituting the second LED row 552 is incident upon the light guiding space 420 through the second light incidence portion 423 and emitted from the second light emission portion 424 through the inside of the light guiding space 420. In other words, light in the vicinity of a light axis emitted from the plurality of LEDs 502 constituting the second LED row 552 travels straight in the light guiding space 420 and is emitted to the front side from the second light emission portion 424. In addition, ambient light, which is emitted from the LED 502 constituting the second LED row 552 and spreads in a vertical direction, is repeatedly totally reflected between the horizontal portion lower surface (first reflective surface) 416 and the second reflective surface 422a of the light guiding space constitutive member 422, and is finally emitted to the front side from the second light emission portion 424.

Furthermore, ambient light, which is emitted from the LED 502 constituting the second LED row 552 and spreads in a horizontal direction (main scanning direction Y), travels in an angled direction with respect to the sub-scanning direction X while being repeatedly totally reflected between the horizontal portion lower surface (first reflective surface) 416 and the second reflective surface 422a of the light guiding space constitutive member 422, and is finally emitted to the front side from the second light emission portion 424 (not shown). As a result, light that is scattered and made to be substantially uniform in the main scanning direction Y (a secondary irradiation luminous flux 420H) is emitted from the second light emission portion 424. Therefore, it is possible to suppress uneven light intensity (uneven illuminance) due to intermittent arrangement of the plurality of LEDs 502 in the main scanning direction Y.

In addition, the reflective mirror 541 configured as described above reflects and deflects the secondary irradiation luminous flux 420H, emitted from the second light emission portion 424 of the light guiding space 420, so as to condense toward the reading target portion R on the original G. As a result, the secondary irradiation luminous flux 420H irradiates the reading target portion R on the original G at a predetermined angle from the front side (an opposite side to the primary irradiation luminous flux 410H).

As described above, according to the illumination portion 340, the light emitted from the first light emission portion 413 is irradiated onto the original G from the rear side (a first side) in the sub-scanning direction X. In addition, according to the illumination portion 340, the light emitted from the second light emission portion 424 is irradiated onto the original G from the front side (a second side) in the sub-scanning direction X.

Here, as shown in FIG. 7, the image reading device 300 according to the present embodiment includes a luminescence control unit 450 as the luminescence control unit. The luminescence control unit 450 controls luminescence in the plurality of LEDs 501 constituting the first LED row 551 and in the plurality of LEDs 502 constituting the second LED row 552 independently.

The luminescence control unit 450 can control the plurality of LEDs 501 constituting the first LED row 551 and the plurality of LEDs 502 constituting the second LED row 552 such that either one of the two does not emit light.

In addition, the luminescence control unit 450 controls luminescence in the plurality of LEDs 501 constituting the first LED row 551 and in the plurality of LEDs 502 constituting the second LED row 552. For example, the luminescence thereof can be adjusted according to a speed of reading in the image reading device 300, thickness of the original G and the like. Control of the luminescence can be performed by adjusting the supply voltage and the like for the plurality of LEDs 501 constituting the first LED row 551 and for the plurality of LEDs 502 constituting the second LED row 552.

Next, operations of the image reading device 300 according to the present embodiment are described hereinafter.

First, the flap member 70 (see FIG. 1) is made to be in an open state and the original G is placed on a reading surface 302A (see FIG. 3). The optical sensor 362 (see FIG. 3) detects that an original is placed on the reading surface 302A.

Subsequently, the flap member 70 is made to be in an opened state. When a start switch (not shown) is pressed, the image reading device 300 instructs the color copy machine 1 to copy an image of the original G. When a start switch (not shown) is pressed, the image reading device 300 starts an operation of reading the image of the original G.

More specifically, first, the pluralities of LEDs 501 and 502 in the LED unit 500 (see FIGS. 3 to 5) are turned on. Light emitted from the plurality of LEDs 501 in the first LED row 551 thus turned on is emitted as the primary irradiation luminous flux 410H from the first light emission portion 413 through the inside of the light guiding body 410 of the light guiding portion 400. The light thus emitted irradiates the reading target portion R on the original G at a predetermined angle from the rear side. On the other hand, light emitted from the plurality of LEDs 502 in the second LED row 552 thus turned on is emitted as the secondary irradiation luminous flux 420H from the second light emission portion 424 through the light guiding space 420. The secondary irradiation luminous flux 420H is reflected and deflected by the reflective mirror 541, and irradiates the reading target portion R on the original G at a predetermined angle from the front side.

Therefore, the reading target portion R on the original G is irradiated with the primary irradiation luminous flux 410H from the first side in the sub-scanning direction X, and with the secondary irradiation luminous flux 420H from the second side in the sub-scanning direction X. As a result, the reading target portion R on the original G is irradiated with line-like light that extends in the main scanning direction Y from both sides (front and rear sides) in the sub-scanning direction X.

The illumination unit 347 and the mirror unit 349 are moved in the sub-scanning direction X while the reading target portion on the original G is irradiated with light. The illumination unit 347 and the mirror unit 349 are moved while maintaining a length of the light path H constant.

An imaging luminous flux from the original G is incident upon the imaging lens 357 after being reflected by the first mirror 321, the second mirror 322, and the third mirror 323 (see FIG. 3).

The imaging lens 357 forms an image of the original G on an acceptance surface of the CCD 358. The CCD 358 reads image information of the original G thus formed on the acceptance surface by converting thereof into an electric signal (see FIG. 3).

Here, since the original G is irradiated with light emitted by the light guiding portion 400 from the first and second sides in the sub-scanning direction X, generation of an edge shadow on an image being read can be suppressed (see FIGS. 3 and 4).

The image information read by the CCD 358 is output to the CCD substrate 361. The image information being output to the CCD substrate 361 is then output to the device main body M via a predetermined circuit substrate (see FIG. 3).

The image information that is input to the device main body M is input to an image forming control unit (not shown).

The image forming control unit controls the photoreceptor drums 2a to 2d as the image supporting body, the charging portions 10a to 10d, the laser scanner units 4a to 4d, the developing units 16a to 16d and the like constituting the image forming portion, based on the image information. A predetermined toner image is formed on the photoreceptor drum 2 based on the image information (see FIG. 1).

An image similar to the image of the original G is transferred to the paper T, which is conveyed to the primary transfer nips N1a, N1b, N1c, and N1d formed by the photoreceptor drum 2, based on the image information. The paper T, on which the image is formed, is ejected from the first ejecting portion 50a and the second ejecting portion 50b to the outside of the device main body M (see FIG. 1).

As shown in FIG. 5, according to the present embodiment, the light guiding portion 400 includes: the light guiding body 410 having the first light incidence portion 412 and the first light emission portion 413; the light guiding space constitutive member 422 that is disposed at a position facing the horizontal portion lower surface 416 in the light guiding body 410 and includes the second reflective surface 422a; and the light guiding space 420 that is formed between the horizontal portion lower surface 416 and the second reflective surface 422a, and includes the second light incidence portion 423 and the second light emission portion 424. In addition, the reading target portion R is irradiated with the primary irradiation luminous flux 410H emitted from the first light emission portion 413 of the light guiding body 410 and the secondary irradiation luminous flux 420H emitted from the second light emission portion 424 of the light guiding space 420. Therefore, according to the present embodiment, a plurality of light guiding paths (a light guiding body 410, a light guiding space 420) can be formed in a simple structure and adjustment of irradiation position of light irradiated onto the original G is easy.

In addition, according to the present embodiment, the reading target portion R on the original G is irradiated from front and rear sides with the primary irradiation luminous flux 410H emitted from the first light emission portion 413 of the light guiding body 410 and the secondary irradiation luminous flux 420H emitted from the second light emission portion 424 of the light guiding space 420. This can prevent generation of an edge shadow on an image being read.

In addition, the present embodiment includes the reflective mirror 541 that is disposed to correspond to the second light emission portion 424 of the light guiding space 420, and reflects and deflects the secondary irradiation luminous flux 420H, toward the reading target portion R on the original G. Therefore, according to the present embodiment, the reading target portion R on the original G can be irradiated with the secondary irradiation luminous flux 420H emitted from the light guiding space 420 that is disposed in parallel to the light guiding body 410, from an opposite side to the primary irradiation luminous flux 410H emitted from the light guiding body 410.

In addition, the present embodiment includes the luminescence control unit 450 that controls luminescence in the first LED row 551 and in the second LED row 552 in the LED unit 500 independently. As a result, according to the present embodiment, the intensity of light of the primary irradiation luminous flux 410H and the secondary irradiation luminous flux 420H can be controlled independently.

Furthermore, in the present embodiment, the luminescence control unit 450 controls luminescence by adjusting the supply voltage for the LEDs 501 and 502 in the first LED row 551 and the second LED row 552 in the LED unit 500. As a result, according to the present embodiment, the luminescence can be easily adjusted.

Figure 8:
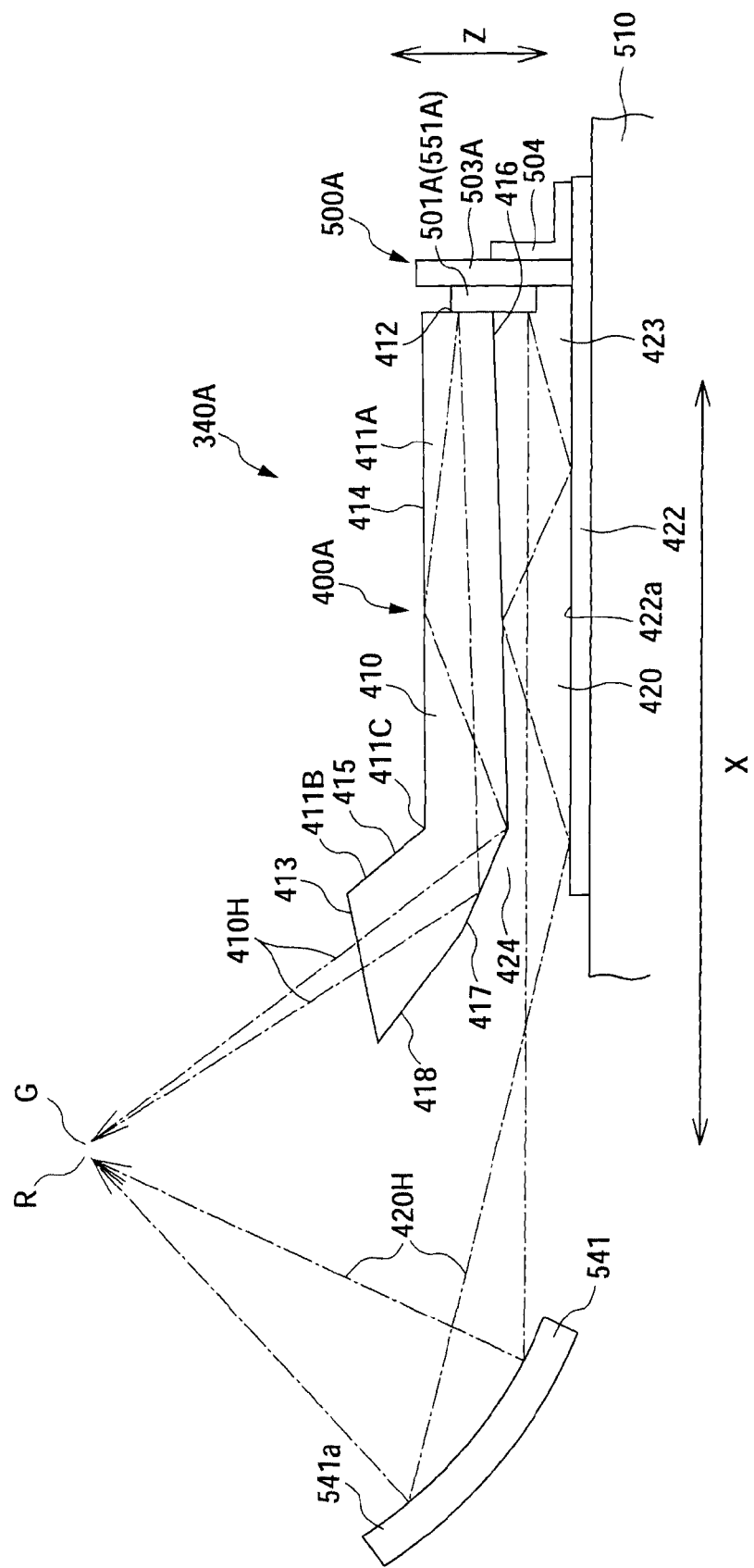
FIG. 8 is a cross-sectional view showing a configuration of the illumination portion 340 according to the second embodiment.
Figure 9:
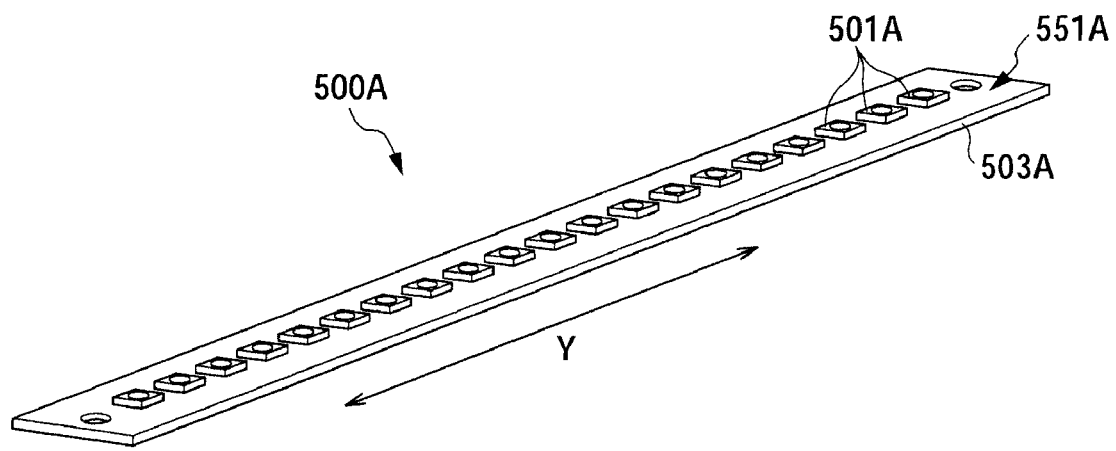
FIG. 9 is a perspective view of the LED unit 500 shown in FIG. 8.

Next, a color copy machine according to a second embodiment of the present invention is described with reference to FIGS. 8 to 9. FIG. 8 is a cross-sectional view showing a configuration of the illumination portion 340 according to the second embodiment. FIG. 9 is a perspective view of the LED unit 500 shown in FIG. 8.

The color copy machine according to the second embodiment has a similar configuration to that of the color copy machine 1 according to the first embodiment, except for the LED unit 500A. Hereinafter, the LED unit 500A, which differs from the color copy machine 1 according to the first embodiment, is mainly described and descriptions of other components are omitted. In addition, drawings for the first embodiment are accordingly incorporated.

As shown in FIGS. 8 and 9, the LED unit 500A is configured to include an LED row 551A that is formed by arranging a plurality of LEDs 501A at predetermined intervals in the main scanning direction Y.

The LED unit 500A is attached to an attaching member 510 via the bracket 504 in a state where an emitted light axis of each of the LEDs 501A constituting the LED row 551A and an array direction of the LEDs 501A are substantially parallel to the contact glass 335, respectively.

Here, the emitted light axis of each of the LEDs 501A constituting the LED row 551A in the LED unit 500A and the horizontal portion lower surface 416 of the light guiding body 410 in the light guiding portion 400A are configured to substantially coincide with each other. It should be noted that, in FIG. 8, an emission position of light toward the light guiding body 410 and an emission position of light toward the light guiding space 420 are shown to be away from each other in a thickness direction Z for visibility.

Light emitted from each of the LEDs 501A constituting the LED row 551A is split horizontally. The light thus split is incident upon the light guiding body 410 and the light guiding space 420, respectively. In other words, a substantial upper half of the light emitted from each of the LEDs 501A is incident upon the light guiding body 410 through the first light incidence portion 412. Then, the light incident upon the light guiding body 410 is emitted from the first light emission portion 413 through the inside of the light guiding body 410 (primary irradiation luminous flux 410H). On the other hand, a substantial lower half of the light emitted from each of the LEDs 501A is incident upon the light guiding space 420 through the second light incidence portion 423 and emitted from the second light emission portion 424 through the inside of the light guiding space 420 (secondary irradiation luminous flux 420H).

In the abovementioned configuration according to the second embodiment, light can be incident upon the light guiding body 410 and the light guiding space 420 by the LED unit 500A including a single LED row 551A.

The balance of intensity of light incident upon the light guiding body 410 and the light guiding space 420 can be adjusted by changing and adjusting the relative position of the LED unit 500A and the light guiding portion 400A in the thickness direction Z. In other words, the distribution of intensity of light incident upon the light guiding body 410 and the light guiding space 420, regarding light emitted from the LEDs 501A, can be changed (adjusted) by changing a position of an emitted light axis of each of the LEDs 501A constituting the LED row 551A relative to the horizontal portion lower surface 416 of the light guiding body 410 in the light guiding portion 400A.

The second embodiment can provide the following effects, in addition to the same effects as in the first embodiment.

More specifically, since light can be incident upon the light guiding body 410 and the light guiding space 420 by the LED unit 500A including a single LED row 551A, it becomes possible to reduce component cost.

The first and the second embodiments have been described above as preferred embodiments of the present invention; however, the present invention is not limited thereto and can be carried out in various modes. For example, the copy machine 1 is exemplified in the present embodiment as an image forming apparatus; however, the present invention is not limited thereto and can be a black and white copy machine, a printer, a facsimile machine and a multi-functional printer having functions thereof.

In addition, the image reading device 300 is formed to be integrated with the device main body M in the first and the second embodiments; however, the present invention is not limited thereto, and the image reading device can be configured with a housing other than the device main body M. For example, the image reading device 300 can be configured to be removable with respect to the device main body M.

Furthermore, the image reading device 300 can be configured such that an upper surface of the attaching member 510, to which the first frame body 311 is attached, is used as the light guiding space constitutive member 422 (second reflective surface 422a). This can further reduce the number of components and assembly steps.

The light guiding portion 400 can have a bi-layered structure in which the light guiding space 420 is disposed above the light guiding body 410.

The reflective member such as the reflective mirror 541 can be provided to correspond to both or either one of the first light emission portion 413 of the light guiding body 410 and the second light emission portion 424 of the light guiding space 420.

What is claimed is:

1. An image reading device comprising:
    A luminescence portion that emits light for irradiating an original;
    A light guiding body that is disposed between the luminescence portion and the original, and has a first light incidence portion disposed on a side to the luminescence portion and a first light emission portion disposed on a side to the original;
    a first reflection surface that is a part of an outer surface of the light guiding body connecting the first light incidence portion and the first light emission portion;
    a light guiding space constitutive member having a second reflection surface that is disposed at a position facing the first reflection surface and that faces the first reflection surface;
    a light guiding space formed between the first reflection surface and the second reflection surface, having a second light incidence portion disposed on a side to the luminescence portion and a second light emission portion disposed on a side to the original;
    at least one mirror that forms a light path by reflecting a luminous flux from the original;
    an imaging lens that forms an image from the luminous flux reflected by the at least one mirror;
    and a reading portion that is disposed in an imaging position of the imaging lens, and reads an image of the original based on image formation by the imaging lens.

2. The image reading device according to claim 1, wherein light from the first light emission portion is irradiated onto the original from a first side in a sub-scanning direction, and light from the second light emission portion is irradiated onto the original from a second side in the sub-scanning direction.

3. The image reading device according to claim 1, wherein, between the first light incidence portion and the first light emission portion, the light guiding body includes:
    a bend portion where the light guiding body bends;
    a horizontal portion that extends in a sub-scanning direction from the first light incidence portion to the bend portion;
    and a slope portion that extends from the bend portion to the first light emission portion while sloping toward the original.

4. The image reading device according to claim 3, wherein the horizontal portion has a horizontal portion upper surface that is formed on a side to the original and a horizontal portion lower surface that is formed on an opposite side to the side to the original, and the slope portion has a slope portion upper surface that extends from the horizontal portion upper surface toward the side to the original and a slope portion lower surface that extends from the horizontal portion lower surface toward the side to the original.

5. The image reading device according to claim 2, further comprising a reflective member that is disposed to correspond to the first light emission portion or the second light emission portion, and reflects light from the first light emission portion or the second light emission portion toward the side to the original.

6. The image reading device according to claim 5, wherein the reflective member is provided with a reflective surface having a concave shaped cross-section.

7. The image reading device according to claim 1, wherein the luminescence portion includes a plurality of luminescence members that is arranged in series at predetermined intervals in a main scanning direction.

8. The image reading device according to claim 1, wherein the luminescence portion includes a luminescence member group composed of a plurality of luminescence members that is arranged in series at predetermined intervals in a main scanning direction,
    and the light guiding body includes a horizontal portion lower surface forming the light guiding space, and is disposed such that the horizontal portion lower surface substantially coincides with an emitted light axis of the luminescence member.

9. The image reading device according to claim 1, wherein the luminescence portion has a luminescence member group composed of a plurality of luminescence members that is arranged in series at predetermined intervals in a main scanning direction,
    and the light guiding body includes a horizontal portion lower surface forming the light guiding space, and is configured such that distribution of intensity of light between the first light incidence portion and the second light incidence portion can be changed by changing a positional relationship between the horizontal portion lower surface and the emitted light axis of the luminescence member.

10. The image reading device according to claim 1, wherein the luminescence portion includes a plurality of luminescence members, and the plurality of luminescence members is arranged in series at predetermined intervals in a main scanning direction and arranged in a plurality of rows in a direction orthogonal to the main scanning direction.

11. The image reading device according to claim 10, wherein the luminescence portion includes a first luminescence member group that is arranged in series at predetermined intervals in the main scanning direction, and a second luminescence member group that is disposed in line in a direction orthogonal to the main scanning direction of the first luminescence member group,
    and the first luminescence member group is disposed to face the first light incidence portion, and the second luminescence member group is disposed to face the second light incidence portion.

12. The image reading device according to claim 11, further comprising a luminescence control unit that controls luminescence in each of the first luminescence member group and in the second luminescence member group independently.

13. The image reading device according to claim 11, further comprising a luminescence control unit that controls luminescence in each of the first luminescence member group and in the second luminescence member group independently, such that intensity of light from the first light emission portion irradiated onto the original and intensity of light from the second light emission portion irradiated onto the original are substantially equal.

14. The image reading device according to claim 12, wherein the luminescence control unit controls luminescence by changing a supply voltage to the plurality of luminescence members.

15. An image forming apparatus comprising: the image reading device according to claim 1;

an image supporting body on which an electrostatic latent image is formed on a surface thereof based on image information relating to an image of the original that is read by the image reading device;

a developing unit that develops a toner image on the electrostatic latent image formed on the image supporting body;

a transfer portion that directly or indirectly transfers the toner image formed on the image supporting body to a predetermined paper; and a fixing portion that fixes the toner image transferred to the predetermined paper by the transfer portion.

* * * * *